United States Patent [19]

Bentley et al.

[11] 4,317,120
[45] Feb. 23, 1982

[54] SECTOR SCAN ADF SYSTEM

[75] Inventors: W. Ferrel Bentley, Smyrna; Arthur Luedtke, Marietta; James E. Scott, Austell, all of Ga.

[73] Assignee: The United States of America as represented by the Field Operations Bureau of the Federal Communications Commission, Washington, D.C.

[21] Appl. No.: 78,270

[22] Filed: Sep. 24, 1979

[51] Int. Cl.³ .............................................. G01S 3/54
[52] U.S. Cl. ............................ 343/120; 343/113 DE
[58] Field of Search ........................ 343/113 DE, 120

[56] References Cited

U.S. PATENT DOCUMENTS

| | | | |
|---|---|---|---|
| 2,539,413 | 1/1951 | Fischer | 343/120 |
| 3,824,596 | 7/1974 | Guion et al. | 343/120 X |
| 4,062,015 | 12/1977 | Litva et al. | 343/120 |
| 4,163,978 | 8/1979 | Shepherd et al. | 343/120 |
| 4,219,821 | 8/1980 | Selim | 343/113 R |
| 4,263,597 | 4/1981 | Bentley et al. | 343/121 |

Primary Examiner—T. H. Tubbesing
Attorney, Agent, or Firm—Wm. Ferrel Bentley

[57] ABSTRACT

An automatic radio direction finding system having inputs for a circular array with a plurality of directional antennas, each being switched in sequence producing a directional pattern in azimuth. The combined RF signal is carried through the receiver as a normal AM modulated signal and the intermediate frequency output of the receiver is detected and the added modulation is recovered, filtered, and accumulated in such a manner that random signals will cancel and any repetitive signals will increase in amplitude and be stored. The vector information of this stored modulation, when decoded with respect to the phase of the original modulation, contains the actual bearing information. The signal is then averaged over several cycles and displayed on a numerical readout in degrees azimuth. The averaging techniques are employed to eliminate jitter in the last digit. A second display, a circular bar-graph, also uses averaging to remove jitter, and gives the operator a more instinctive feel for the tendencies of a changing bearing.

7 Claims, 4 Drawing Figures

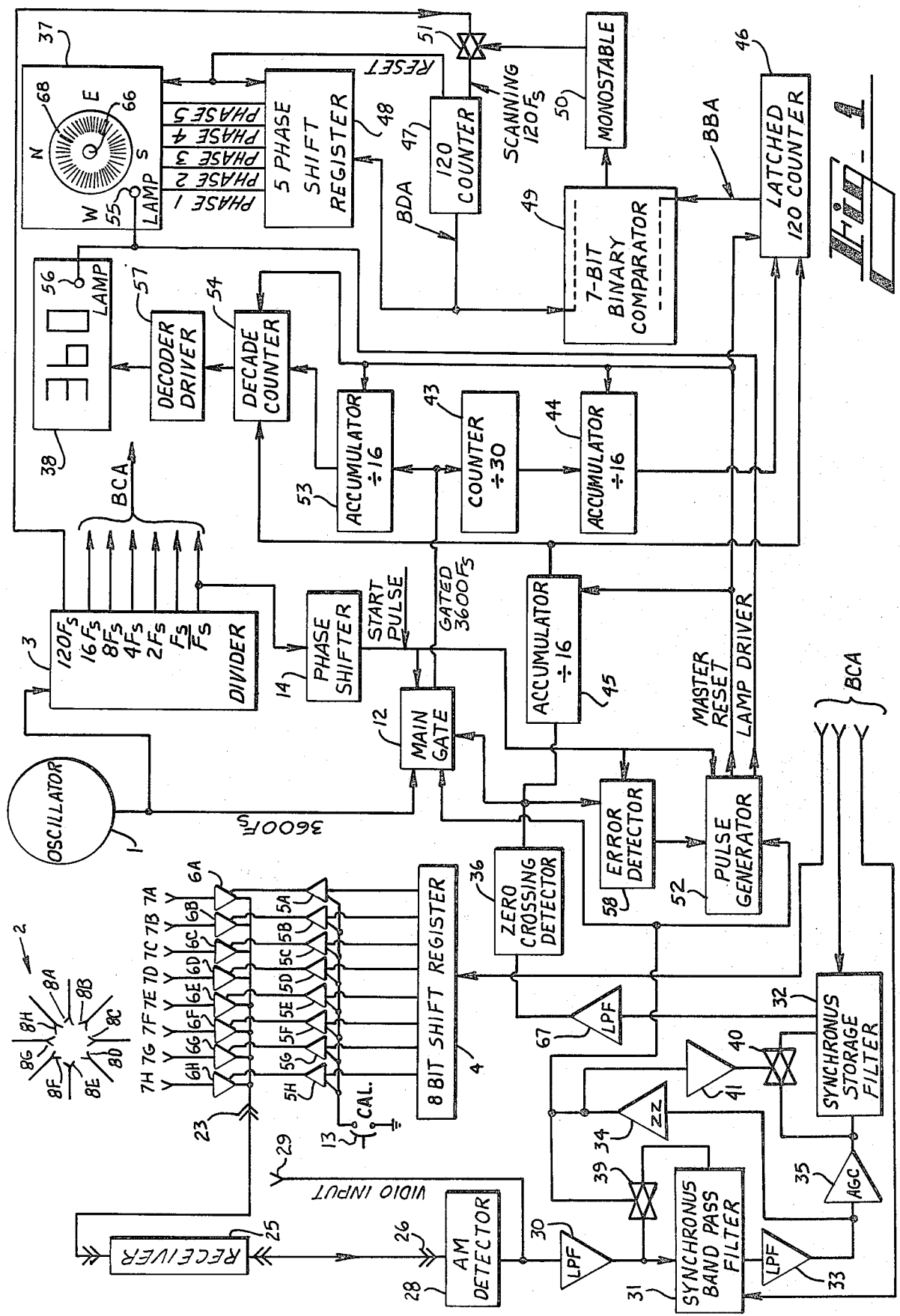

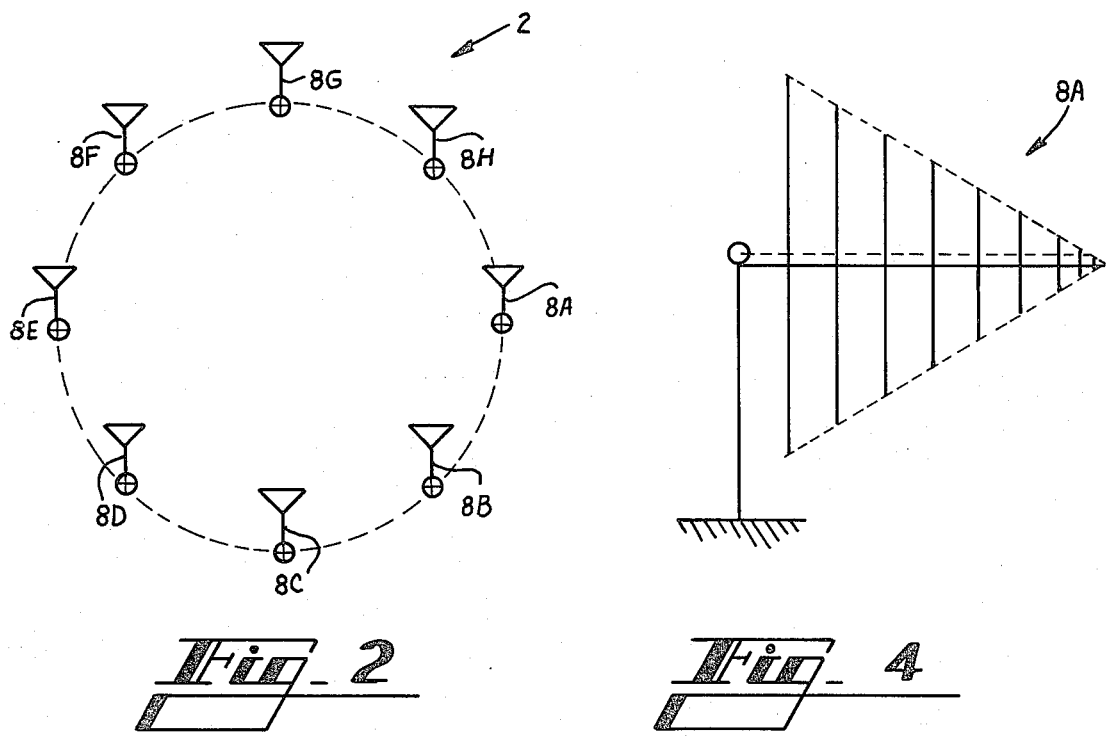
Fig_2
Fig_4
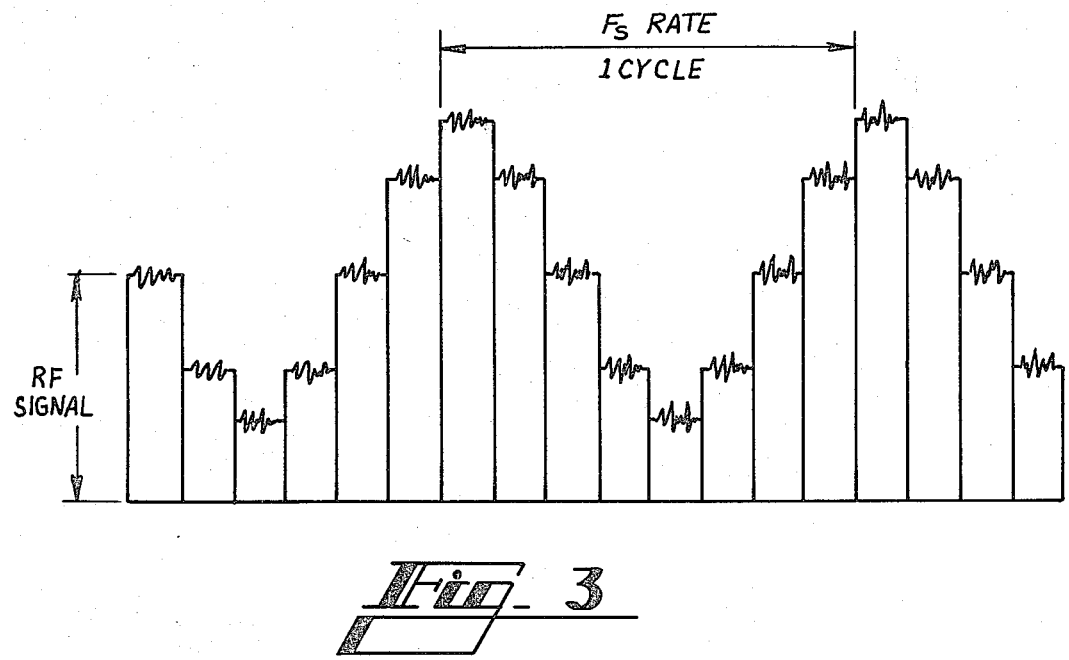
Fig_3

SECTOR SCAN ADF SYSTEM

BACKGROUND OF THE INVENTION

1. Field of the Invention

This invention relates to radio frequency automatic direction finding (ADF) systems and, particularly, to a quasi-doppler automatic direction finding system utilizing amplitude modulation impressed on the received radio frequency signal. It concerns circular antenna array systems that continuously observe over a complete 360 degrees in azimuth to instantly determine the direction of an incoming signal.

2. Description of the Prior Art

Radio direction finding has long been used by aircraft and marine service as an aid for navigation to determine the location of the receiving station. The ADF systems which are commercially available usually consist of a sense antenna, a loop antenna, and a combiner phase shifter to form a special pattern. This type of ADF operates over a narrow band of one octave or less and is usually limited to a number of discrete frequencies with a special dedicated receiver.

Other methods use mechanical rotation of loops or other directional antennas. These systems require large amounts of power and have all of the mechanical problems associated with physically rotating an antenna. Still other systems derive the bearing information by use of the null, rather than lobe because the null is narrower and will provide more accuracy when adequate signal strength is available. The primary disadvantage of the null type DF or the rotating antenna is that the signal is always fading in and out destroying the intelligence. Another problem with conventional automatic direction finding systems which utilize the null of the antenna pattern is that under weak signal conditions the signal strength approaches the sensitivity threshold of the receiver, thereby broadening the width of the null and limiting the system accuracy. Furthermore the time required to obtain a bearing is on the order of several seconds creating a particular problem with uncooperative transmitters because the signal may not stay on that long.

Another type of automatic direction finding system utilizes the doppler principle. These switching systems require an omnidirectional antenna pattern for each antenna in the array. This usually limits the practical bandwidth to less than one octave because the gain falls off very rapidly both above and below the resonant frequency of the antenna. Of further concern is the number of antennas required for a doppler array. Phasing considerations require antennas no more than a quarter wavelength apart and site error minimization dictates an array as large as possible. As the diameter of the array is increased, the greater number of antennas and connections becomes more and more complicated as well as requiring higher scanning rates and more antenna drivers.

SUMMARY OF THE INVENTION

It is the object of this invention to provide a new and improved automatic direction finding system that has extremely wide frequency capability and is highly accurate. Another object of this invention is to provide a novel ADF system that does not require the use of motors, servos, or rotating antennas. Additionally the system will have ADF capability for all types of received signals regardless of the type of modulation, be it AM, pulse, or wide or narrow band FM. It will provide a means for averaging, integration, and storage of bearing. The antenna array will have a large aperture to minimize site errors. Furthermore, it will have a display system for accurate display of bearing as well as one that gives the operator the inherent ability to know from which direction the signal is coming instantly.

BRIEF DESCRIPTION OF THE DRAWING

The invention will be readily understood in light of the description of the embodiment of the present invention which follows. In the drawings which form part of the disclosure, like reference numerals refer to like elements.

FIG. 1 illustrates the complete block diagram of the preferred embodiment of the ADF system.

FIG. 2 illustrates the array of antennas.

FIG. 3 illustrates the detected signal.

FIG. 4 illustrates one of the individual antennas.

DESCRIPTION OF THE PREFERRED EMBODIMENT

The oscillator 1 originates the waveforms generated to modulate the antenna patterns, the signals that scan the bar-graph display 37, and the signals that control the filtering of the bearing information from the receiver. The antenna 2 is scanned at a discrete frequency which hereafter shall be referred to as Fs. The oscillator 1 oscillates at a rate of 3600 Fs and the divider 3 has outputs as multiples of Fs for the purpose of synchronizing the separate functions of the ADF system. All outputs of the divider 3 except 120 Fs shall be defined as the Binary Control Address (BCA). The eight bit shift register 4 sequentially produces one pulse out of eight at its outputs. These outputs cycle at the Fs rate and are time spaced in 45 degree increments. They are buffered by amplifiers 5a through 5h. When calibrate switch 13 is activated, amplifier 5a is left on and all the others are turned off. This allows the operator to calibrate the system compensating for delays of the receiver in use. The pulse outputs of the buffer amplifiers drive the RF Pin Diode switches 6a through 6h, which switch the RF inputs 7a through 7h. These switches feed eight antennas 8a through 8h equally spaced in a directional array. The antenna array forms a circle with a physical spacing as large as practical to reduce the site errors. The number of antennas in the array of the circle is dependent on the beam width of the antenna. The antennas should be designed such that the patterns are overlapping and the amplitude variation should be less than three dB at the point of overlap for maximum accuracy. For a well shaped cardioid antenna pattern a minimum of four should be used with optimum performance obtained with eight or more antennas.

The pattern of the antennas must be uniform with respect to each other and they must have a lobe pattern of at least 10 dB. The antennas should have capability to pick up the vertically polarized components of the RF field while minimizng pickup of the horizontal component. The switched outputs of the antennas are fed to the RF output port 23. The sequential switching of the antennas superimposes AM modulation on the received signal, in the form of a stepped sine wave which contains the bearing information.

The RF switched output feeds receiver 25 which is capable of processing a signal with AM low frequency modulation with minimum distortion and delay. The IF signal from the receiver is fed into input jack 26 where it is processed by the AM detector 28. Another input 29 is available for receivers which have a video rather than IF type of output. Either the signal from detector 28 or the video input 29 is processed through a low pass filter 30 to eliminate most of the intelligence and to recover the low level Fs amplitude modulation that was superimposed on the signal.

The input sensitivity or low level response of any filter is dependent on its passband. As the bandwidth of the filter gets narrower the component values become more and more critical. The frequency stability also becomes critical since any frequency change would not only change the amplitude but the phase shift. The response time of the filter likewise increases significantly as the bandwidth decreases. To overcome these difficulties rotary synchronous filters are used. Each is a sixteen step shunt type filter with extremely sharp high pass cut off above the fundamental Fs frequency. The synchronous filters 31, 32, driven by the BCA at 16 Fs, provide enhancement for coherent signals of frequency Fs while attenuating all non-coherent signals. The phase of the recovered Fs signal referenced to the BCA represents the bearing of the received signal. The signal enters the first synchronous filter 31 which momentarily stores the waveform in sixteen time division multiplexed capacitors. The stepped output waveform feeds a low pass filter 33 which smoothes the steps by removing the higher order harmonics and then continues on to both the schmitt trigger type squelch circuit 34 and the AGC amplifier 35. The AGC amplifier 35 compensates for different output levels from various receivers and holds the output level from the filters within a narrow range. The AGC is necessary to keep following circuits operating in their optimum ranges to reduce the error in the zero crossing detector 36. The filtered and leveled signal from the AGC amplifier 35 enters a second synchronous filter 32 which is similar to the first but has a much longer time constant to provide averaging and storage of the signal. The output of filter 32 is filtered by low pass filter 67 to remove higher order harmonics then fed to the zero crossing detector 36 which produces a stop pulse corresponding to the zero crossover. The storage time of the second filter allows the squelch 34 to turn off before the output level can drop enough to cause a bearing error in the displayed value; when the squelch 34 is turned off the output displays 37, 38 are frozen and will continue to display the last value of the filter. The first synchronous filter 31 initially has a four ms time constant and is switched to fifteen ms when the squelch 34 is turned on indicating that a signal is present and the filter is loaded with bearing information. The rising squelch 34 also changes the state of the gate 39 which controls the time constant of filter 31 and triggers one shot 41 which turns on gate 40, controlling the time constant of filter 32. The second filter 32 initially has a one hundred ms time constant, and momentarily switches to one ms time constant for four hundred and seventy ms when the output of the one shot 41 goes high. This allows the incoming signal to charge the first filter 31 rapidly, dumps a preliminary bearing into the second filter 32, after which the system slowly integates new data to refine the bearing. This allows the ADF to get a quick bearing even if it has some error; then if the signal stays on long enough, time integration can inhance and refine the data to yield a more accurate bearing.

The bearing data itself is derived by counting gated pulses from the 3600 Fs reference signal. As the input signal rises above the set squelch level the squelch output rises and sets the main gate 12 so that the gate will open on the rise of the next start pulse from the adjustable phase shifter 14. The main gate 12 is closed at the rise of the next stop pulse, which comes from the zero crossing detector 36. The number of pulses at the 3600 Fs rate which pass through the main gate while it is open represents the bearing to 0.1 degree resolution but because of system fluctuations any readouts at this point would be unusable. Instead the pulses are divided in the counter 43 by thirty to produce gated 120 Fs. The bearing information is then averaged in the accumulator 44 by dividing the gated 120 Fs by sixteen. Accumulator 45 divides the stop pulse by sixteen also and the output is used to stop the counter 46 as it counts the output of accumulator 44. The counter 46 provides this binary bearing address BBA through a latched output. The 120 counter 47, meanwhile, counts the ungated 120 Fs from the divider and provides the binary display address BDA. The decimal equivalent of the binary display address is the number of the corresponding segment of the 120 element bar-graph circle. The shift register 48 takes this binary display address and produces synchronized five phase driving voltage for the scanning of the bar-graph display 37. The counter 47 also generates the pulse to reset itself and the display.

The binary comparator 49 compares the BBA from latched counter 46 with the BDA from counter 47. When the two seven bit words are identical, the comparator output triggers monostable 50 whose output turns off the scanning gate 51 for the duration of the monostable's pulse. While the scanning gate 51 is off, clocking is momentarily stopped for the counter 47, which also stops the five phase shift register 48 and the self-scanning display 37. Since the segment 68 of the display at which the scanning stops is illuminated for a much greater period of time than the other segments, it then becomes an intensified cursor in a circle of light to indicate the bearing of the received signal. The contrast between the cursor and the other segments is set by the pulse width of the monostable 50. At the end of this pulse the scanning gate 51 is turned back on and the counter 47, shift register 48, and display 37 resume clocking until the counter 47 reaches one hundred and twenty it then generates the reset signal. Then the scanning begins at zero while the comparator seeks a new match, at which time the cursor is again generated. When there is no signal the squelch circuit of the system prohibits counter from updating and the last bearing address remains stored in the output latch of the counter 46. Therefore, a cursor will continue to be generated at the bearing of the last received signal. Simultaneously accumulator 53 uses the gated Fs and accumulates sixteen bearing samples after which it is counted by a decade counter 54. Then a decoder driver 57 takes the output from the counter and drives the display 38 indicating the bearing numerically in degrees. When a new signal is received the squelch circuit opens, and pulse generator 52 activates the master reset. This sets up the accumulators 44, 45, 53, and counters 46, 54 to start on a new count from zero. When the bearing displayed is a stored value the output of the squelch 34 sets the pulse generator 52 such that the indicating lamps 55 and 56 are off.

The error detector 58 will generate a pulse resetting all counters and accumulators when the bearing shifts between 359° and zero degrees during the time the main gate is open. This prevents the averaging circuitry from averaging 359 and zero and displaying an incorrect bearing at 180 degrees. Both displays will then display zero instead of 360 degrees.

To eliminate the possible glare problem a circular polarizer is used in front of the bar-graph display. A linear polarizer is placed in front of the display and the circular polarizer which can be rotated by means of the knob 66. When these two polarizers approach the crossed position the light transmitted through will be reduced controlling the intensity of the display.

FIG. 2 illustrates the antenna array 2 consisting of eight directional broad band antennas 8a through 8g equally spaced with their patterns outward, from the array. These antennas would normally be placed as high as possible and as far away from any metal obstructions as possible.

FIG. 3 illustrates the ideal RF pick up voltage that is fed to the receiver. The phase of the low frequency modulation of this waveform with respect to the start pulse determines the angle of arrival. This same pattern is carried through the receiver and the recovered DC stored in the filter bands has an identical shape.

FIG. 4 illustrates one of the antennas 8a which is in the array 2. This particular antenna is a Log Periodic Antenna, and would normally have gain over a 10 to 1 frequency range.

Various modifications are contemplated and it is understood that certain features and subcombinations are of utility and may be obviously resorted to by those skilled in the art without reference to other features and subcombinations. As only the preferred embodiment thereof has been disclosed there are many possible embodiments of the invention without departing from the spirit and scope of the invention thereof.

What is claimed is:

1. An automatic direction finding system for instantaneously determining the direction of the location of a radio frequency source with respect to the receiving location comprising:

a regular polyangular directional antenna array consisting of four or more antennas whose spacing is not limited by frequency, each antenna having a directional pattern of identical directional shape and of equal value, the antennas being switched in sequence to effectively produce a rotating pattern; a switcher means which combines the separate antenna signals onto a common signal port on which is superimposed an AM modulation related to the direction of the signal source; a receiver means which processes the common RF signal and feeds the resultant signal to a detector means; the entire system being synchronized by a controlling means which coordinates the actions of a driver means, a filter means, an accumulation means, and a display means; said driver means creating switching voltages which control said switcher means, the output of said detector means being followed by said filter means which can then integrate and store the bearing information, said accumulation means averaging bearing information from said filter means which output is then fed to said bearing display means, error detecting to minimize erroneous bearings being built into said bearing display means as well as a bearing status indicating means to display the current status of the indicated bearing.

2. A direction finding system of claim 1 in which the controlling means consists of a crystal oscillator with frequency at least 3600 times the basic rotation rate of the ADF, incorporating a divider to produce the multiples of the rotation rate that are needed to control the system.

3. A direction finding system of claim 1 in which said driver means consists of a shift register and buffer amplifier that create sequential driving pulses one for each antenna with a repetition rate equal to the rotation rate of the ADF system, a calibrate function turns off all but the straight ahead antenna when calibrate is activated.

4. A direction finding system of claim 1 in which said switcher means is pin diodes which connect the antennas sequentially one at a time to the output while providing normal termination to all non selected antennas at any instant.

5. A direction finding system of claim 1 in which said detector means consists of an AM detector with short phase delay which detects the low frequency modulation superimposed upon the RF signal by the antenna system.

6. A direction finding system of claim 1 in which the bearing display means is a numeric display driven by a counter which holds the previous bearing until a new signal is processed to update the display.

7. A direction finding system of claim 1 in which the bearing display means is a circular bar-graph display with an intensified cursor to indicate the bearing; the relative intensity of the cursor controllable by time division and the absolute intensity controlled by the angle between polarized filters.

* * * * *